United States Patent
Kuntz

[11] Patent Number: 5,902,614
[45] Date of Patent: May 11, 1999

[54] VALVE-GATED INJECTION MOULDING DEVICE

[75] Inventor: John Peter Kuntz, Papendrecht, Netherlands

[73] Assignee: Eurotool Beheer B.V., 'S-Gravendeel, Netherlands

[21] Appl. No.: 08/941,316

[22] Filed: Sep. 30, 1997

[30]     Foreign Application Priority Data

Oct. 9, 1996 [EP] European Pat. Off. .............. 96202819

[51] Int. Cl.⁶ .................................................. B29C 45/23
[52] U.S. Cl. ...................................... 425/564; 264/328.9
[58] Field of Search .................................. 425/562, 563, 425/564, 565, 566; 264/328.9

[56]                References Cited

U.S. PATENT DOCUMENTS

| | | | |
|---|---|---|---|
| 3,915,358 | 10/1975 | Hehl | 425/570 |
| 4,076,485 | 2/1978 | Sokolow | 425/562 |
| 4,212,626 | 7/1980 | Gellert | 425/562 |
| 4,286,941 | 9/1981 | Gellert | 425/566 |
| 4,289,468 | 9/1981 | Von Holdt | 425/566 |
| 4,919,606 | 4/1990 | Gellert | 425/549 |
| 5,208,046 | 5/1993 | Shah et al. | 425/130 |

FOREIGN PATENT DOCUMENTS

| | | |
|---|---|---|
| 0 282 999 | 9/1988 | European Pat. Off. . |
| 0 312 098 | 4/1989 | European Pat. Off. . |
| 0 405 663 | 1/1991 | European Pat. Off. . |

*Primary Examiner*—Tim Heitbrink
*Attorney, Agent, or Firm*—Young & Thompson

[57]                ABSTRACT

A valve-gated injection moulding device, wherein the actuating device of the valve pin comprises a first arm and a second arm. The first arm is hingingly connected in a first end tot he rearward end of the valve pin. The second end of the first arm is hingingly connect to a displacement device, which can be moved along a radial displacement trajectory. The second arm is with its first end hingingly connected to the midpoint of the first arm. The second end of the second arm is connected in a fixed hinge point to a support of the injection moulding device. In this way, using a radial actuating device, only an axial force is exerted on the valve pin. The stroke of the valve pin can easily be adjusted from outside the mould by increasing or decreasing the stroke of the piston. The actuating device is relatively small, and does not require a large re-routing of the melt passage as it is positioned radially outwardly from the longitudinal center line of the valve pin. it can be operated from outside the mould. The adjustment of the height of the valve pin can take place outside the mould.

3 Claims, 1 Drawing Sheet

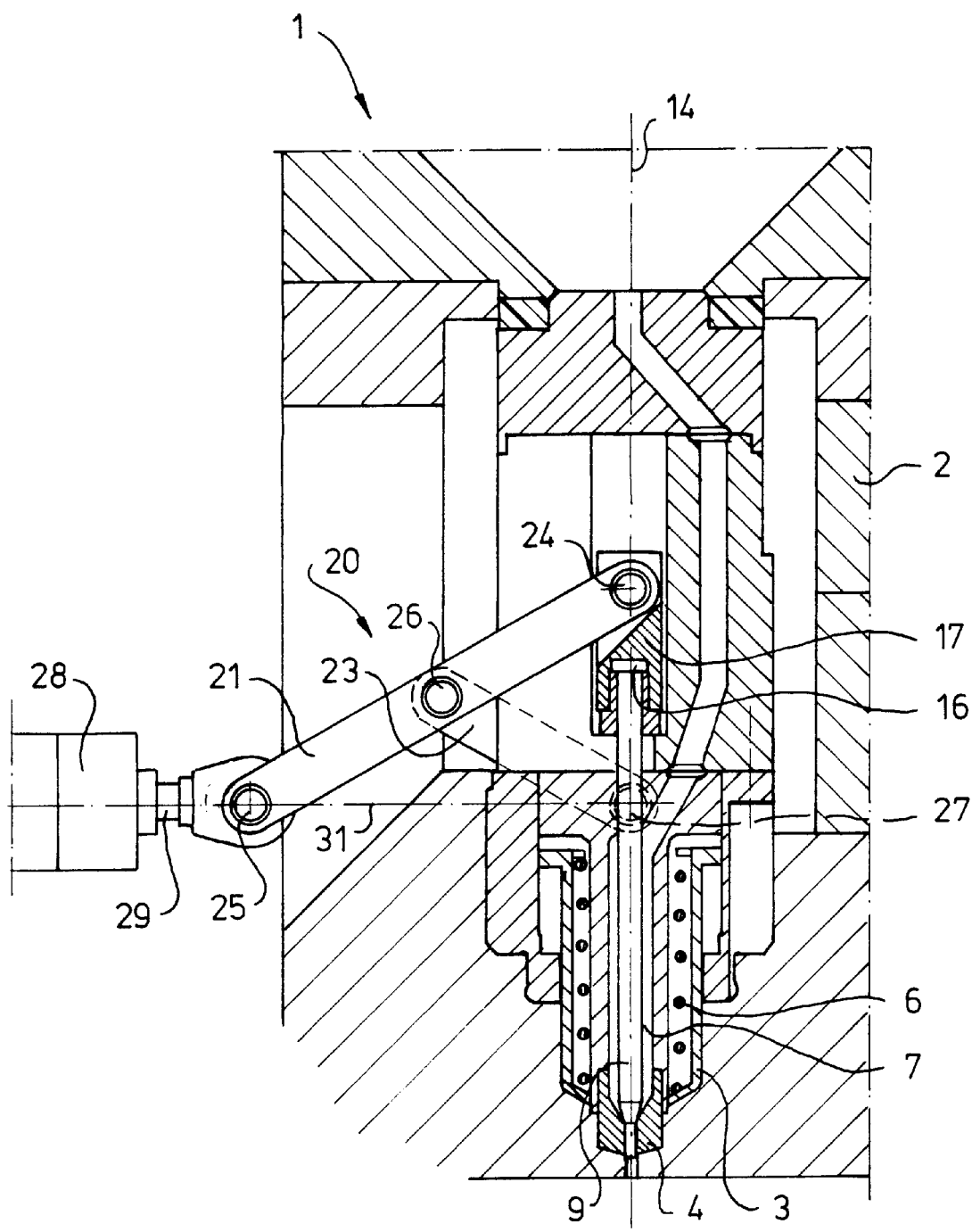

VALVE-GATED INJECTION MOULDING DEVICE

FIELD OF THE INVENTION

The invention relates to valve-gated injection moulding device comprising
- a nozzle with an elongated melt passage with a forward end and a rear end,
- a gate located at the forward end of the nozzle,
- a valve pin mounted in the melt passage and being movable in the axial direction thereof, the valve pin having a tip for closing off the gate and a rear end and,
- an actuating device mounted on a support structure of the injection moulding device and connected with the rear end of the valve pin for moving the valve pin in the axial direction.

BACKGROUND OF THE INVENTION

Such a valve-gated injection moulding device is known from EP-A-282 999. In the known injection moulding device, a mechanically actuated valve pin is used for opening and closing the gate in a so-called hot-runner injection moulding device. In the hot-runner device, heating elements are provided along the melt passage of the nozzle for maintaining the thermoplastic material which is to be injected through the gate into an injection cavity, in a molten state. The valve pin is guided in a guide bushing which also functions as a seal for the thermoplastic material. Therefore there is very little play between the valve pin and the guide bushing such as to maintain a sufficient seal (for instance at a 4 millimetre diameter of the valve pin, only 0.005 millimetre play can be allowed. The valve pin should be very accurately guided to avoid jamming of the valve pin. Thereto it is very important to only load the valve pin in an axial direction and to avoid exerting radial forces thereon. Radial forces exerted on the valve pin cause a friction which should be overcome, requiring more energy in the actuating means for the valve pin, may cause stick-slip phenomena, inaccurate positioning of the valve pin, wear, etc. As the guide bushing of the valve pin cannot be lubricated, the avoidance of radial forces is very important. During the high operating temperatures (200–300° C.) most lubricants will flow out of the lubrication gap, and can leak into the molten thermoplastic material causing contamination.

In the known actuating device of the valve pin as shown in EP-A-0 282 999, the rearward end of the valve pin is cylindrical and is received into a U-shaped bracket of a lever which radially extends towards the valve pin. By pivoting the lever around a pivot point, the valve pin can be moved in the axial direction, while the cylindrical surface of the valve pin head slides with respect to the actuating surfaces of the U-shaped bracket at the end of the lever. The known actuating device has as a disadvantage that radial forces are still exerted on the valve pin head. Accurate guiding of the rearward end of the valve pin is not possible. Furthermore, the stroke of the valve pin is limited and cannot be easily adjusted to prevailing process conditions after mounting the nozzle in the cavity plate.

It is also known to provide actuating devices which are axially aligned with the valve pin. These systems have as a disadvantage that adjustment of the valve pin height after mounting in the cavity plate is no longer possible. Furthermore a large space above the nozzle is required for such axially aligned systems. For single-nozzle systems which are directly connected to the injection moulding device, this space is not available.

SUMMARY OF THE INVENTION

It is an object of the present invention to provide a valve-gated injection moulding device having a compact actuating device for the valve pin, which can easily be adjusted after mounting in a cavity plate of an injection moulding cavity.

It is a further object of the present invention to provide an actuating device which to a large extent avoids radial forces to be exerted on the valve pin and allows for accurate guiding and positioning of the valve pin. Thereto the injection moulding device according to the present invention is characterized in that, the actuating device comprises a first arm which with a first end is hingingly attached to the rear end of the valve pin, and with a second end hingingly is attached to drive means which are movable along a radial displacement trajectory, and a second arm with a first end which is hingingly attached to the first arm, and with a second end which is hingingly attached to the support structure in a fixed-position hinge point, the fixed position hinge point and the second end of the first arm being located on a line substantially parallel to the radial displacement trajectory, and the first end of the first arm and the fixed position hinge point being located on a line substantially parallel to the center line of the valve pin.

In this way, using a radial actuating device, only an axial force is exerted on the valve pin. The stroke of the valve pin can easily be adjusted from outside the mould by increasing or decreasing the stroke of the piston. The actuating device according to the present invention is relatively small, and does not require a large re-routing of the melt passage as it is positioned radially outwardly from the longitudinal centre line of the valve pin. It can be operated from outside the mould. The adjustment of the height of the valve pin can take place outside the mould.

Preferably the first end of the second arm is connected to substantially the midpoint of the first arm, the length of the second arm being substantially equal to half the length of the first arm.

BRIEF DESCRIPTION OF THE DRAWINGS

An embodiment of the valve-gated injection moulding device according to the present invention will be illustrated by way of example with reference to the sole accompanying drawing.

DETAILED DESCRIPTION OF THE INVENTION

The FIGURE shows a cross-sectional view of a part of a valve-gated injection moulding device 1. In the injection moulding device, a nozzle 3 is placed in a cavity plate 2. At its bottom end, the nozzle 3 comprises a gate 4 which terminates in a mould cavity, the details of which are not shown in the figure. The nozzle 3 comprises a central melt passage 7. From an injection moulding machine, which is not shown in this figure, molten thermo-plastic material is transferred via an upstream melt passage towards the melt passage 7. Heating elements 6 extend around the melt passage 7 for maintaining the thermoplastic material in a molten state. When the mould cavity has been filled with molten thermoplastic material, a valve pin 9 can be moved along an axial direction of the melt passage 7. In the figure, the axial direction is the direction along the centre line 14. The valve pin 9 is guided in a guide bushing which also acts as a sealing element for the molten thermoplastic material. After solidification of the molten thermoplastic material in the mould cavity, the injection moulded objects can be removed therefrom, and the valve pin 9 can be retracted to open the gate 4 such that molten thermoplastic material can be introduced into the mould cavity.

As can be seen in the sole figure, the valve-pin head 16 is received in a connecting member 17. The connecting member 17 is hingingly connected to an actuating device 20, comprising a cylinder 28. The connecting member 17 fits with a large play into an axial bore without engaging the side walls of said bore. As no radial forces are exerted on the connecting member 17 by the actuating device 20 according to the present invention, the connecting member 17 does not have to be supported in the radial direction by the walls of the axial bore and can freely and accurately be displaced.

The actuating device 20 comprising a first arm 21 and a second arm 23. The first end 24 of the first arm 21 is hingingly connected to the connecting member 17 at the rear end of the valve pin 9. The second end 25 of the first arm 21 is hingingly connected to the end of a piston rod 29 of actuating cylinder 28. A second arm 23 is with its first end 26 connected to the midpoint of the first arm 21. The second end 27 of the second arm 23 is connected to a fixed hinge point on the support of the injection moulding device.

The actuating device according to the present invention rotates the line of action on the connecting member 17, which line of action is originally located along the displacement trajectory 31 of the piston rod 29, by 90° such that it is located along the center line 14. As can be seen in the sole figure, radial displacement of the second end 25 of the first arm 21, causes the first end 24 of the first arm, which is connected to the connecting member 17, to move along the direction of the center line 14 of the valve pin 9 upon displacement of the piston rod 29 along the radial displacement trajectory 31. No radial forces are exerted on the connecting member 17 during such axial movement thereof.

I claim:

1. In a valve-gated injection moulding device comprising
   a nozzle with an elongated melt passage with a forward end and a rear end,
   a gate located at the forward end of the nozzle,
   a valve pin mounted in the melt passage and being movable in the axial direction thereof, the valve pin having a tip for closing off the gate and a rear end and,
   an actuating device mounted on a support structure of the injection moulding device and connected with the rear end of the valve pin for moving the valve pin in the axial direction, the improvement wherein the actuating device comprises a first arm having a first end hingingly attached to the rear end of the valve pin, and a second end hingingly attached to drive means which are movable along a radial displacement trajectory, and a second arm with a first end which is hingingly attached to the first arm, and a second end hingingly attached to the support structure in a fixed-position hinge point, the fixed position hinge point and the second end of the first arm being located on a line substantially parallel to the radial displacement trajectory, and the first end of the first arm and the fixed position hinge point being located on a line substantially parallel to the center line of the valve pin.

2. Valve-gated injection moulding system according to claim 1, wherein the first end of the second arm is connected to substantially the midpoint of the first arm, and the length of the second arm is substantially equal to half the length of the first arm.

3. Valve-gated injection moulding device according to claim 1, wherein the actuating device further comprises a cylinder with a piston rod located along the radial displacement trajectory.

\* \* \* \* \*